US008447982B2

(12) United States Patent
Lee

(10) Patent No.: US 8,447,982 B2
(45) Date of Patent: May 21, 2013

(54) SYSTEM AND METHOD FOR OPERATING END-TO-END SECURITY CHANNEL BETWEEN SERVER AND IC CARD

(76) Inventor: Sung-man Lee, Gyeonggi-do (KR)

(*) Notice: Subject to any disclaimer, the term of this patent is extended or adjusted under 35 U.S.C. 154(b) by 263 days.

(21) Appl. No.: 12/811,470

(22) PCT Filed: Oct. 31, 2008

(86) PCT No.: PCT/KR2008/006454
§ 371 (c)(1),
(2), (4) Date: Jul. 1, 2010

(87) PCT Pub. No.: WO2009/084806
PCT Pub. Date: Jul. 9, 2009

(65) Prior Publication Data
US 2010/0287375 A1    Nov. 11, 2010

(30) Foreign Application Priority Data

Jan. 2, 2008   (KR) .................. 10-2008-0000175
Jan. 2, 2008   (KR) .................. 10-2008-0000186

(51) Int. Cl.
*H04L 29/06*    (2006.01)
(52) U.S. Cl.
USPC ........................................ 713/171
(58) Field of Classification Search
USPC ........................................... 713/171
See application file for complete search history.

(56) References Cited

U.S. PATENT DOCUMENTS

| 7,315,950    | B1 * | 1/2008 | Baransky et al. | 713/193 |
| 2003/0026428 | A1 * | 2/2003 | Loisel          | 380/277 |
| 2004/0111615 | A1 * | 6/2004 | Nyang et al.    | 713/168 |

(Continued)

OTHER PUBLICATIONS

International Search Report issued in connection with corresponding International Application No. PCT/KR2008/006454 on May 29, 2009.

*Primary Examiner* — Jeffrey Pwu
*Assistant Examiner* — William Corum, Jr.
(74) *Attorney, Agent, or Firm* — The H.T. Than Law Group

(57) ABSTRACT

The present invention relates to a system and method for operating an end-to-end security channel between an IC card and a server on a communication network. A method for connecting an end-to-end security channel between an IC card and a server on a communication network includes the steps of: generating, by the server, a random number Rs for transmission to the IC card, generating an E(Rs) by encrypting the random number Rs by a user public key, and transmitting the E(Rs) to the IC card through the communication network; receiving, by the IC card, the E(Rs) through the communication network and extracting the random number Rs by decrypting the E(Rs) by a user private key; generating, by the IC card, a random number Rc to be transmitted to the server, generating a session key K' by the random number Rs and the random number Rc, and generating a first card verifier MAC by encrypting the random number Rs by the session key K'; transmitting, by the IC card, the random number Rc and the first card verifier MAC to the server through the communication network; receiving, by the server, the random number Rc and the first card verifier MAC through the communication network, generating a session key K by the random number Rs and the random number Rc, and generating a first server verifier MAC by encrypting the random number Rs by the session key K; and comparing, by the server, the first card verifier MAC and the first server verifier MAC to certify the session key K.

12 Claims, 7 Drawing Sheets

U.S. PATENT DOCUMENTS

| | | | |
|---|---|---|---|
| 2006/0059094 A1* | 3/2006 | Oh et al. .................. | 705/51 |
| 2006/0143453 A1* | 6/2006 | Imamoto et al. ............. | 713/169 |
| 2006/0190726 A1* | 8/2006 | Brique et al. ............... | 713/168 |
| 2007/0083750 A1* | 4/2007 | Miura et al. ................. | 713/155 |
| 2009/0037725 A1* | 2/2009 | Farrugia et al. .............. | 713/155 |
| 2009/0161876 A1* | 6/2009 | Sherkin ....................... | 380/278 |

* cited by examiner

[Fig. 5]

SYSTEM AND METHOD FOR OPERATING END-TO-END SECURITY CHANNEL BETWEEN SERVER AND IC CARD

TECHNICAL FIELD

The present invention relates to a system and method for operating an end-to-end security channel between an IC card and a server on a communication network.

BACKGROUND ART

The advancement of information communication technology and modern society provides a variety of financial transaction services through a variety of non-face-to-face channels such as Internet banking.

In the case of a conventional model using an authorized certificate, a terminal such as a computer is used to establish a security channel in connection with a financial company server (or certificate company server). However, the computer is always exposed to a hacking danger because it provides a variety of Internet services as well as financial transaction services.

In order to solve this problem, security programs are installed to enhance the security. This method still has a problem that many hackers use the advanced information communication technology to disable the security programs to hack the financial transaction services.

DISCLOSURE OF INVENTION

Technical Problem

Therefore, an object of the present invention is to provide a system and method for operating an end-to-end security channel between an IC card and a server on a communication network, which can provide a powerful security function by eliminating a hacking danger possibility between the IC card and the server in advance.

Technical Solution

A method for connecting an end-to-end security channel between an IC card and a server on a communication network according to some aspects of the present invention may include the steps of: generating, by the server, a random number Rs for transmission to the IC card, generating an E(Rs) by encrypting the random number Rs by a user public key, and transmitting the E(Rs) to the IC card through the communication network; receiving, by the IC card, the E(Rs) through the communication network and extracting the random number Rs by decrypting the E(Rs) by a user private key; generating, by the IC card, a random number Rc to be transmitted to the server, generating a session key K' by the random number Rs and the random number Rc, and generating a first card verifier MAC' by encrypting the random number Rs by the session key K'; transmitting, by the IC card, the random number Rc and the first card verifier MAC' to the server through the communication network; receiving, by the server, the random number Rc and the first card verifier MAC' through the communication network, generating a session key K by the random number Rs and the random number Rc, and generating a first server verifier MAC by encrypting the random number Rs by the session key K; and comparing, by the server, the first card verifier MAC' and the first server verifier MAC to certify the session key K.

A method for connecting an end-to-end security channel between an IC card and a server on a communication network according to other aspects of the present invention may include the steps of: generating, by the server, a random number Rs for transmission to the IC card, generating an E(Rs) by encrypting the random number Rs by a user public key, and transmitting the E(Rs) to the IC card through the communication network; receiving, by the IC card, the E(Rs) through the communication network and extracting the random number Rs by decrypting the E(Rs) by a user private key; generating, by the IC card, a random number Rc to be transmitted to the server, generating an E(Rc) by encrypting the random number Rc by a server public key, generating a session key K' by the random number Rs and the random number Rc, and generating a first card verifier MAC' by encrypting the random number Rs by the session key K'; transmitting, by the IC card, the E(Rc) and the first card verifier MAC' to the server through the communication network; receiving, by the server, the E(Rc) and the first card verifier MAC' through the communication network, extracting the random number Rc by decrypting the received E(Rc) by a server private key, generating a session key K by the random number Rs and the random number Rc, and generating a first server verifier MAC by encrypting the random number Rs by the session key K; and comparing, by the server, the first card verifier MAC' and the first server verifier MAC to certify the session key K.

Also, the methods may further include the steps of: encrypting, by the server, the random number Rc by the session key K to generate a second server verifier MAC; transmitting, by the server, the second server verifier MAC to the IC card through the communication network; receiving, by the IC card, the second server verifier MAC and encrypting the random number Rc by the session key K' to generate a second card verifier MAC'; comparing, by the IC card, the second card verifier MAC' and the second server verifier MAC to certify the session key K'; and if the session key K' is certified, processing that an end-to-end security channel is connected between the IC card and the server. Also, the methods may further include the steps of: generating, by the IC card, Data' to be transmitted to the server through the communication network; encrypting, by the IC card, the generated Data' by the session key K' to generate E(Data'); and transmitting, by the IC card, the generated E(Data') to the server through the communication network. Also, the methods may further include the steps of: receiving, by the server, the E(Data') from the IC card through the communication network; and decrypting, by the server, the received E(Data') by the session key K to extract the Data'. Also, the methods may further include the steps of: if there is Data to be transmitted to the IC card, encrypting, by the server, the Data by the session key K to generate E(Data); and transmitting, by the server, the generated E(Data) to the IC card through the communication network, and may further include the steps of: receiving, by the IC card, the E(Data) through the communication network; and decrypting, by the IC card, the received E(Data) by the session key K' to extract the Data.

A system for connecting an end-to-end security channel between an IC card and a server on a communication network according to further aspects of the present invention may include: a server for generating a random number Rs for transmission to the IC card, generating an E(Rs) by encrypting the random number Rs by a user public key, and transmitting the E(Rs) to the IC card through the communication network; and an IC card for receiving the E(Rs) through the communication network, extracting the random number Rs by decrypting the E(Rs) by a user private key, generating a random number Rc to be transmitted to the server, generating a session key K'=Rs||Rc by the random number Rs and the random number Rc, generating a first card verifier MAC' by encrypting the random number Rs by the generated session key K', and transmitting the random number Rc and the first card verifier MAC' to the server through the communication network. Herein, the server may receive the random number Rc and the first card verifier MAC' through the communication network, generate a session key K=Rs||Rc by the random number Rc and the first card verifier MAC', generate a first card verifier MAC by encrypting the random number Rs by the session key K, compare the first card verifier MAC' and the first card verifier MAC to certify the session key K, generate, if the session key K' is certified, a second server verifier MAC by encrypting the random number Rc by the session key K, and transmit the generated second server verifier MAC to the IC card through the communication network.

A system for connecting an end-to-end security channel between an IC card and a server on a communication network according to still further aspects of the present invention may include: a server for generating a random number Rs for transmission to the IC card, generating an E(Rs) by encrypting the random number Rs by a user public key, and transmitting the E(Rs) to the IC card through the communication network; and an IC card for receiving the E(Rs) through the communication network, extracting the random number Rs by decrypting the E(Rs) by a user private key, generating a random number Rc to be transmitted to the server, generating an E(Rc) by encrypting the random number Rs by a server public key, generating a session key K'=Rs||Rc by the random number Rs and the random number Rc, generating a first card verifier MAC' by encrypting the random number Rs by the generated session key K', and transmitting the E(Rc) and the first card verifier MAC' to the server through the communication network. Herein, the server may receive the E(Rc) and the first card verifier MAC' through the communication network, extract the random number Rc by decrypting the E(Rc) by a user public key, generates a session key K=Rs||Rc by the random number Rs and the random number Rc, generate a first card verifier MAC by encrypting the random number Rs by the session key K', compare the first card verifier MAC' and the first card verifier MAC to certify the session key K', generate, if the session key K' is certified, a second server verifier MAC by encrypting the random number Rc by the session key K, and transmit the generated second server verifier MAC to the IC card through the communication network.

Also, the systems may further include: a terminal having an IC card reader capable of reading the IC card and providing a communication node between the IC card and the server. Also, the IC card may receive the second server verifier MAC, generate a second server verifier MAC' by encrypting the random number Rc by the session key k', compare the second server verifier MAC' and the second server verifier MAC to certify the session key K, and if the session key K is certified, process that an end-to-end security channel is connected with the server.

Advantageous Effects

The present invention loads an authorized certificate, which is exposed to a hacking danger, into an IC card, thereby making it possible to prevent the danger of the authorized certificate being hacked. Also, the present invention provides a security in an end-to-end (i.e., a server and an IC card) communication channel, as well as a conventional method of connecting a communication channel between a server and a terminal through a communication network, thereby making it possible to provide a more powerful security function. Also, the present invention encrypts a session key to be transmitted by using a server public key provided in a card, thereby making it possible to protect data for generation of the session key that may leak during transmission from the card to the server.

BEST MODE FOR CARRYING OUT THE INVENTION

Hereinafter, specific embodiments will be described in detail with reference to the accompanying drawings. The terms used herein are defined according to the functions of the present invention and may vary depending on the intentions of those skilled in the art. Thus, the definition of the terms must be understood based on the overall descriptions made herein.

Figure 1:
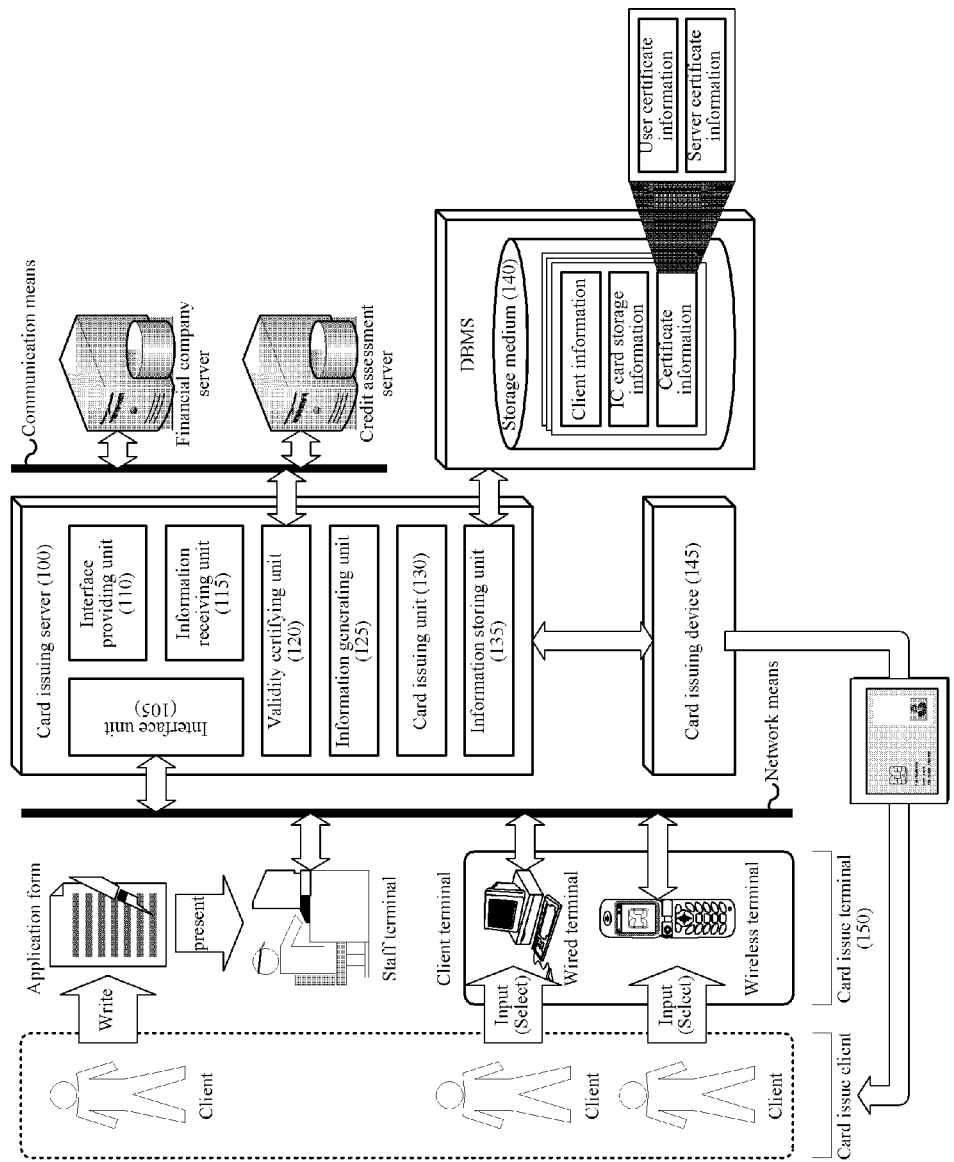
FIG. 1 is a schematic block diagram of a card issuing system for connection of an end-to-end security channel with a financial system according to an embodiment of the present invention.

FIG. 1 is a schematic block diagram of a card issuing system for connection of an end-to-end security channel with a financial system according to an embodiment of the present invention. That is, FIG. 1 illustrates a system in which, when a client provides Integrated Circuit (IC) card issue application information for connection of an end-to-end security channel with a financial system to the financial system through a card issuing interface, the financial system issues an IC card to the client on the basis of the IC card issue application information. The present invention is not limited thereto and includes various modifications and additions that can be made by those of ordinary skill in the art. For example, the present invention may include, as well as the above card issuing system, a card issuing system structure for connection of an end-to-end security channel with a server on a communication network. Also, the issued IC card in FIG. 1 may not have information for financial transaction. Hereinafter, for the sake of convenience, a component corresponding to at least one means, which issues the IC card to the client on the basis of the IC card issue application information through the card issuing interface in the card issuing system of FIG. 1, will be referred to as a card issuing server 100.

Referring to FIG. 1, the card issuing system for connection of an end-to-end security channel with the financial system includes a staff terminal used by a card issuing staff in at least one card issuing institution (or financial institution), and also includes a client terminal including a wired terminal and/or a wireless terminal used by the client if the card issuing system supports non-face-to-face card issue application. The staff terminal and/or the client terminal have/has a communication channel connected through a network means to the card issuing server 100 on the financial system.

In an embodiment of the present invention, when the client visits the card issuing institution (or financial institution) for connection of an end-to-end security channel with the financial system, writes a card issue application form for connection of an end-to-end security channel with the financial system (e.g., a document with a form for writing in at least one information field for connection of an end-to-end security channel with the financial system) through a window (or the card issuing staff) provided in the card issuing institution (or financial institution) (or the card issuing staff visits the client so that the client writes a card issue application form for connection of an end-to-end security channel with the financial system), and presents the written card issue application form to the card issuing staff, the card issuing staff inputs (or selects) information, which is written in the card issue application form, through the staff terminal, and the staff terminal transmits the input (or selected) information through the network means to the card issuing server 100 on the financial system. Herein, it is preferable that the staff terminal includes a staff terminal that is used by the card issuing staff in the card issuing institution (or financial institution). Also, it is preferable that the card issuing server 100 connected to the staff terminal includes a server provided on the card issuing institution (or financial institution or a card issue affiliate institution affiliated with the card issuing institution). The network means connecting the staff terminal and the card issuing server 100 includes a communication network that connects a communication channel therebetween. Also, in card issuing system, the card issue application form written by the client, the staff terminal used by the card issuing staff, and the financial network connecting the staff terminal and the card issuing server 100 serve as a card issuing interface that is used by the client to register IC card issue application information for connection of an end-to-end security channel with the financial system.

In another embodiment of the present invention, if the card issuing system supports non-face-to-face card issue application, when the client connects to the card issuing server 100 through at least one client terminal among a wired terminal connected to a wired communication network and/or a wireless terminal connected to a wireless communication network, and inputs (or selects) IC card issue application information for connection of an end-to-end security channel with the financial system through at least one user interface provided by the card issuing server 100, the client terminal transmits the IC card issue application information through the network means to the card issuing server 100 on the financial system. Herein, the wired terminal connected to the wired communication network is a general term for all terminals connected to a Transmission Control Protocol/Internet Protocol (TCP/IP) based communication network, and it is preferable that the wired terminal includes at least one or more of a desktop computer or a notebook computer connected to the TCP/IP based communication network, or a household terminal (i.e., a set-top-box, etc.) connected to the TCP/IP based communication network, and a KIOSK connected to the TCP/IP based communication network. Also, the wireless terminal connected to the wireless communication network is a general term for all terminals connected to a Code Division Multiple Access (CDMA) based mobile communication network, all terminals connected to a High Speed Downlink Packet Access (HSDPA) based wireless communication network, or all terminals connected to IEEE 802.16x based portable Internet, or all terminals connected to a wireless data communication network using a DataTAC scheme of Motorola or a Mobitex scheme of Erricson, and it is preferable that the wireless terminal includes at least one or more of a Personal Communication System (PCS) or Global System for Mobile communications (GSM) or Personal Digital Cellular (PDC) or Personal Handyphone System (PHS) terminal or Personal Digital Assistant (PDA) or Smart Phone or Telematics connected to the CDMA based mobile communication network, or a wireless communication terminal connected to the HSDPA based wireless communication network, or a portable Internet terminal connected to the IEEE 802.16x based portable Internet, or a wireless data communication terminal connected to the DataTAC/Mobitex based wireless communication network. Also, the client terminal may include a functional structure for outputting at least one user interface provided by the card issuing server 100, inputting and/or selecting at least one information through the user interface, and transmitting the same to the card issuing server 100 (e.g., a function for communication with a browser program, or a function for communication with a communication program communicating with the card issuing server 100). Also, in the card issuing system, the client terminal including at least one of the wired terminal and/or the wireless terminal used by the client and at least one wired communication network and/or wireless communication network connecting the client terminal and the card issuing server 100 serve as a card issuing interface that is used by the client to register IC card issue application information for connection of an end-to-end security channel with the financial system.

In further another embodiment of the present invention, if the card issuing system supports non-face-to-face card issue application, a card issue terminal 150 may further include, as well as the staff terminal and/or the client terminal, an automatic financial machine (not shown) including an Automatic Teller Machine (ATM) or a Cash Dispenser (CD) connected to a financial network (e.g., a financial common network), or a call terminal (not shown) connected to a wired telephone network such as a Public Switched Telephone Network (PSTN) or a Voice over IP (VoIP) network, or a call terminal (not shown) connected to a wireless telephone network such as a mobile communication network or a wireless VoIP network, or a terminal (or a server) (not shown) provided in at least one institution affiliated with the card issuing institution (or financial institution), to which the present invention is not limited. If the card issue terminal 150 is the automatic financial machine, the automatic financial machine and the financial network connecting the automatic financial machine to the card issuing server 100 serve as a card issuing interface that is used by the client to register IC card issue application information for connection of an end-to-end security channel with the financial system. If the card issue terminal 150 is the call terminal, the call terminal and the wired telephone network or wireless telephone network connecting the call terminal to the card issuing server 100 serve as a card issuing interface that is used by the client to register IC card issue application information for connection of an end-to-end security channel with the financial system. If the card issue terminal 150 is the terminal (or server) provided in the institution affiliated with the card issuing institution (or financial institution), the terminal (or server) and the network connecting the terminal (or server) to the card issuing server 100 serve as a card issuing interface that is used by the client to register IC card issue application information for connection of an end-to-end security channel with the financial system.

When an IC card is issued to the client on the basis of the IC card issue application information provided from the card issue terminal 150, a storage medium 140 stores IC card issue information according to the IC card issue. The IC card issue information stored in the storage medium 140 is used on the financial system for connection of an end-to-end security channel with the financial system. According to an embodiment, the storage medium 140 is provided on the financial system or in a DBMS on a financial system connected therewith. Herein, the storage medium 140 may be a ledger D/B provided in the DBMS on the financial system, or a database connected with the ledger D/B, to which the present invention is not limited.

The card issuing server 100 is a general term for the components of the financial system connected through a network means to the card issue terminal 150. The card issuing server 100 may include at least one server (or device), or may be embodied in at least one program recorded in a recording medium provided in the server (or device), to which the present invention is not limited. Also, the card issuing server 100 includes an interface unit 105 (or an interface means) for providing a card issuing interface to the card issue terminal 150 through the network means.

According to an embodiment, if the card issue terminal 150 is a staff terminal connected to a financial network, the interface unit 105 connects a communication channel with the staff terminal on the basis of a protocol stack defined on the financial network, and provides a communication interface for transmission/reception of at least one information (or data) by using a communication protocol defined in a card issue application program provided in the staff terminal.

According to another embodiment, if the card issue terminal 150 is a client terminal including a wired terminal connected to a wired communication network, the interface unit 105 provides a communication interface for connecting a communication channel with the client terminal on the basis of a protocol stack defined on the wired communication network, and transmitting/receiving at least one information (or data) by using a communication protocol defined in a communication program provided in the client terminal. For example, if a browser program corresponding to a Hyper-Text Transfer Protocol (HTTP) protocol is provided in the client terminal, the interface unit 105 provides a communication interface for connecting a communication channel with the client terminal on the basis of the TCP/IP protocol, and transmitting/receiving a webpage (e.g., Hyper-Text Markup Language (HTML) compatible webpage) and/or information by using an HTTP protocol defined in the browser program. If the card issue application program provided from the card issuing server 100 is provided in the client terminal, the interface unit 105 provides a communication interface for connecting a communication channel with the client terminal on the basis, and receiving information (or data) by using a communication protocol defined in the communication program.

According to still another embodiment of the present invention, if the card issue terminal 150 is a client terminal including a wireless terminal connected to a wireless communication network, the interface unit 105 provides a communication interface for connecting a communication channel with the client terminal on the basis of a protocol stack defined in the wireless communication network, and transmitting/receiving at least one information (or data) by using a communication protocol defined in a communication program provided in the client terminal. For example, if a browser program corresponding to a Wireless Application Protocol (WAP) or a Mobile Explorer (ME) protocol is provided in the client terminal, the interface unit 105 provides a communication interface for connecting a communication channel with the client terminal on the basis of the CDMA protocol, and transmitting/receiving a webpage (e.g., a Wireless Markup Language (WML) compatible webpage or an HTML compatible webpage) and/or information by using a WAP/ME protocol defined in the browser program. If the card issue application program provided from the card issuing server 100 is provided in the client terminal, the interface unit 105 provides a communication interface for connecting a communication channel with the client terminal on the basis of the CDMA protocol, and transmitting/receiving information (or data) by using a communication protocol defined in the communication program.

Also, as illustrated in FIG. 1, the card issuing server 100 further includes an interface providing unit 110, an information receiving unit 115, a validity certifying unit 120, an information generating unit 125 (or an information generating means), an information storing unit 135, and a card issuing unit 130 for issuing an IC card including the IC card storage information through a card issuing device 145.

When the card issue terminal 150 connects to the card issuing server 100 through the interface unit 105, the interface providing unit 110 generates a user interface for inputting (or selecting) the IC card issue application information in correspondence with the functional structure of the card issue terminal 150 and transmitting the same to the card issuing server 100 through the network means, and/or extracts the user interface from a database (not illustrated), and provides the generated (or extracted) user interface to the card issue terminal 150 through the network means in connection with the interface unit 105. Then, the card issue terminal 150 inputs (or selects) the IC card issue application information on the basis of the user interface and transmits the input (or selected) IC card issue application information to the card issuing server 100 through the network means. According to an embodiment, if the card issue terminal 150 is a staff terminal connected to a financial network, the interface providing unit 110 generates (or extracts) a user interface providable to a card issue application program provided in the staff terminal and provides the generated (or extracted) user interface to the staff terminal through the interface unit 105. According to another embodiment, if the card issue terminal 150 is a client terminal including a wired terminal connected to a wired communication network, the interface providing unit 110 generates (or extracts) a user interface providable to a browser program and/or a communication program provided in the client terminal and provides the generated (or extracted) user interface to the client terminal through the interface unit 105. According to still another embodiment, if the card issue terminal 150 is a client terminal including a wireless terminal connected to a wireless communication network, the interface providing unit 110 generates (or extracts) a user interface providable to a browser program and/or a communication program provided in the client terminal and provides the generated (or extracted) user interface to the client terminal through the interface unit 105.

Also, when the card issue terminal 150 inputs (selects) IC card issue application information through the user interface and transmits the same through the network means, the information receiving unit 115 receives the IC card issue application information in connection with the interface unit 105 and provides the received IC card issue application information to the validity certifying unit 120 or the information generating unit 125. According to an embodiment, the IC card issue application information includes at least one of client information of the card issue client and IC card information for verifying that an IC card issued to the client is an IC card for connection of an end-to-end security channel with the financial system. Herein, it is preferable that the client information includes at least one of personal information of the card issue client (e.g., client name, resident registration number, address, wireless terminal information (or mobile phone number), and e-mail address) and member information of the client registered in the card issuing server 100 (e.g., member ID information). Also, it is preferable that the IC card information includes at least one of authorized certificate information, server certificate information, and user certificate information provided in an IC card for connection of an end-to-end security channel with the financial system, and the IC card information may further include use specification information of the IC card.

Also, on the basis of the received IC card issue application information, the validity certifying unit 120 verifies the validity of issuing the IC card to the client.

Also, on the basis of the IC card issue application information received through the information receiving unit 115, the information generating unit 125 generates (or extracts) IC card storage information to be provided in the IC card for the client. The IC card storage information includes at least one of a card number corresponding to the IC card (e.g., a 16-digit card number), effective term information (partially omittable), and card issuing institution information (or code). For example, the card number may include a 4-digit card issuing institution number, a 2-digit card type number, a 9-digit serial number, and a check digit. Also, it is preferable that the effective term information includes the available term (or expiry date) of the IC card. The effective term information may be omitted if there is no effective term in the IC card. Also, it is preferable that the card issuing institution information (or code) includes at least one unique number (or unique code) assigned to a card issuing institution (or financial company) issuing the IC card to the client.

Also, when IC card storage information of the IC card is generated by the information generating unit 125, the card issuing unit 130 produces an IC card including the IC card storage information through the IC card issuing device 145 (or loads the IC card storage information into the IC card) and the IC card is provided (or sent) to the client. Herein, the card issuing device 145 includes a device for recording the IC card storage information in a memory of an IC chip of the IC card. In this case, the information generating unit 125 generates (or extracts) the IC card storage information in a file structure operatable through a Chip Operating System (COS) provided in the IC chip, and the card issuing unit 130 records the IC card storage information in the memory of the IC chip through the card issuing device 145, thereby issuing an IC card to the client. Thus, the produced IC card is provided to the client and/or sent to the client according to a card providing procedure, so that the client uses the IC card through the financial system according to the present invention.

The information storing unit 135 stores IC card issue information in the storage medium 140, which includes at least one of client information included in the IC card issue application information received from the client through the information receiving unit 115, the generated IC card storage information, and at least one certificate information for connection of an end-to-end security channel with the financial system (e.g., user certificate information or server certificate information). Herein, the client information in the IC card issue information includes at least one of personal information of the card issue client (e.g., client name, resident registration number, address, wireless terminal information (or mobile phone number), and e-mail address) and member information of the client registered in the card issuing server 100 (e.g., member ID information). Also, for connection of an end-to-end security channel between the IC card and the financial system, the certificate information in the IC card issue information includes at least one of user certificate information and server certification information. Herein, it is preferable that the user certificate information includes public key information for encrypting a random number Rs generated by the financial system for connection of an end-to-end security channel with the financial system, and it is preferable that the server certificate information includes private key information for decrypting the generated random number Rs after generation of a random number Rc to be transmitted to the financial system for connection of an end-to-end security channel with the financial system. Also, certificate management information may be further included to manage the certificate information including at least one of the user certificate information and the server certificate information.

Figure 2:
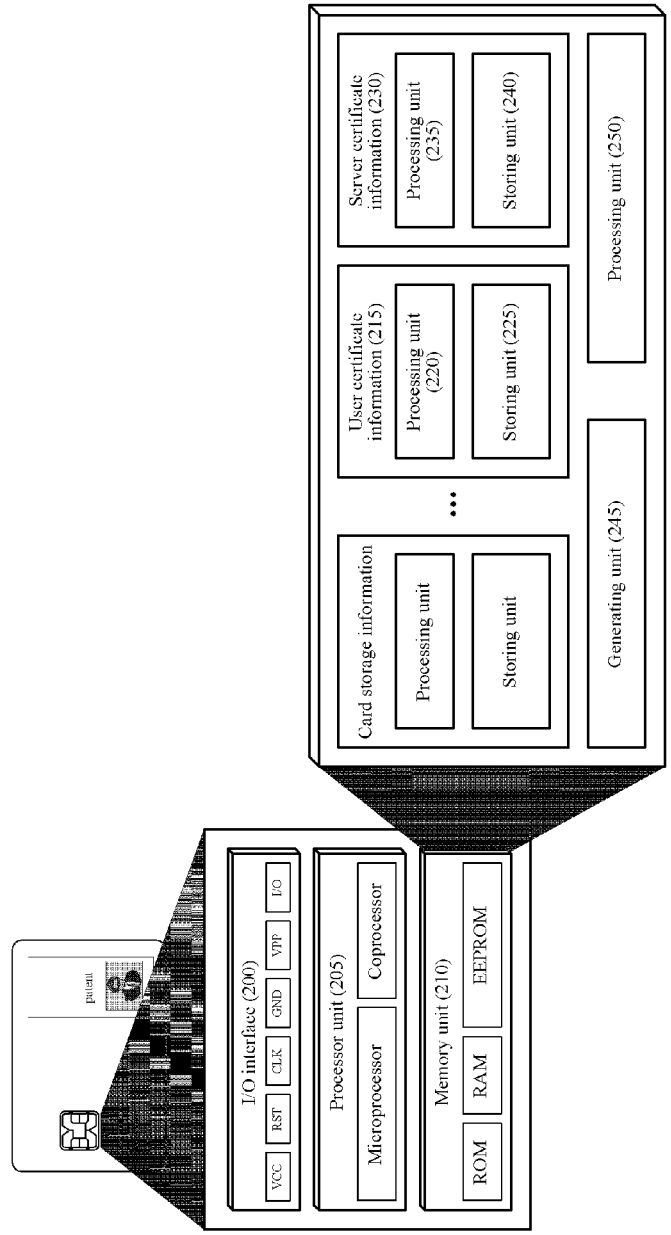
FIG. 2 is a schematic block diagram of an IC card for connection of an end-to-end channel with a financial system on a communication network according to an embodiment of the present invention.

FIG. 2 is a schematic block diagram of an IC card for connection of an end-to-end channel with a financial system on a communication network according to an embodiment of the present invention. That is, FIG. 2 illustrates an IC card structure that includes user certificate information 215 and server certificate information 230, for connection of an end-to-end security channel with the financial system on the communication network, in a memory on an IC chip of the IC card issued through the card issuing system of FIG. 1. The present invention is not limited thereto and includes various modifications and additions that can be made by those of ordinary skill in the art. For example, in the memory, only server certificate information 230 may be provided in the IC card for connection of an end-to-end security channel with the financial system on the communication network.

Referring to FIG. 2, the IC chip of the IC card includes: at least one I/O interface 200 for inputting/outputting data; a memory unit 210 for storing card information and card application codes; and a processor unit 205 for executing the application codes.

The IC chip of the IC includes an I/O interface 200 for connecting to a card terminal in a contact manner through a contact point, such as a power supply VCC, a reset signal RST, a clock signal CLK, a ground GND, a programming power supply VPP, and/or an input/output I/O, according to the ISO/IEC 7816 standard and communicating with the financial system (e.g., command or data exchange) through the card terminal, or includes an I/O interface 200 for communicating with the financial system (e.g., command or data exchange) through a card terminal in a noncontact manner through two antenna connection contact points (not illustrated) according to the ISO/IEC 14443 standard. Also, the IC chip stores server certificate information 230, which is provided by an certifying server distributing a server certificate, in a storage area of the memory unit 210 on a block basis. Also, the IC chip includes a memory unit 210 for storing server address information corresponding to the server certificate.

Also, the processor unit 205 includes at least one or more operational elements including a Central Process Unit (CPU), a Micro Process Unit (MPU), and a co-processor, and executes an application code stored in the memory unit 210.

Also, the processor unit 205 controls an application for detecting a memory address storing a server public key included in the server certificate from a block stored in the memory storage area, and extracting the server public key from the detected memory address.

Also, the memory unit 210 includes: nonvolatile memories including at least one or more of a Read Only Memory (ROM), an Electrically Erasable and Programmable Read Only Memory (EEPROM), and a Flash Memory (FM); and at least one or more volatile memories (or execution memories) such as Random Access Memories (RAMs). The memory unit 210 stores card information and a card application code operating based on the card information. Specifically, a memory (e.g., a ROM) of the memory unit 210 stores a program code corresponding to a Chip Operating System (COS) for managing and operating IC card internal resources. If a given power is supplied from the financial system through a card terminal through the power supply (VCC) contact point of the I/O interface 200, a COS stored in the memory unit 210 is loaded into an execution memory to control an overall operation of the IC chip and to control information/data exchange between the financial system through the card terminal and the IC chip through an Application Protocol Data Unit (APDU) on the basis of a clock frequency (e.g., 3.57 MHz or 4.9 MHz) of the clock signal (CLK) contact point.

Also, the memory unit 210 stores user certificate information 215 for connection of an end-to-end security channel with the financial system on the communication network. Like the card storage information, the user certificate information 215 includes: a storage unit 225 storing private key information corresponding to the user certificate information 215; and a processing unit 220 corresponding to a card application code provided in the IC chip corresponding to the user certificate information 215. Herein, it is preferable that the private key information (i.e., user private key information) includes information for receiving and decrypting an E(Rs) transmitted by encrypting a random number Rs generated by the financial system on the communication network.

Also, the memory unit 210 stores server certificate information 230 for connection of an end-to-end security channel with the financial system on the communication network. Like the card storage information, the server certificate information 230 includes: a storage unit 240 storing public key information corresponding to the server certificate information 230; and a processing unit 235 corresponding to a card application code provided in the IC chip corresponding to the server certificate information 230. Herein, it is preferable that the public key information (i.e., server public key information) includes information for generating a random number Rc to be transmitted to the financial system and generating an E(Rc) by encrypting the random number Rc through the public key information.

Also, for connection of an end-to-end security channel with the financial system on the communication network, the memory unit 210 includes: a generating unit 245 for generating a session key K' through a random number Rc generated by the IC card and a random key Rs decrypted after reception from the financial system; and a processing unit 250 for generating a card verifier MAC' by encrypting the random number Rs using the generated session key K' and processing the generated card verifier MAC' to be transmitted to the financial system on the communication network, or generating an E(Rc) by encrypt the random number Rc generated by the IC card through the server public key and processing the generated E(Rc) to be transmitted to the financial system on the communication network, or receiving a server verifier MAC from the financial system and generating/comparing the card verifier MAC' by encrypting the random number Rc generated by the IC card through the session key K' to certify the session key K'.

It is preferable that the processing unit 250 further includes a function for processing of connection of an end-to-end security channel between the IC card and the financial system upon completion of the certification of the session key K'. Also, it is preferable that the processing unit 250 further includes a function for generating Data' to be transmitted to the financial system through the security channel upon completion of the certification of the session key K', generating E(Data') by encrypting the generated Data' by the session key K', and transmitting the generated E(Data') to the financial system through the security channel. Depending on the intentions of those skilled in the art, the decrypted Data may be provided to a terminal with an IC card reader (or a terminal connected to the terminal with the IC card reader). Also, it is preferable that the processing unit 250 further includes a function for receiving information input by the terminal with the IC card reader (or information received according to an APDU protocol) in connection with the I/O interface 200.

Also, according to an embodiment, the session key K' is generated by classifying the random number Rs obtained by decrypting the encrypted E(Rs) received from the financial system and the random number Rc generated by the IC card into high and low regions; Exclusive OR (XOR)-operating a high region Rs_H and a low region Rs_L of the random number Rs and a high region Rc_H and a low region Rc_L of the random number Rc to generate a high SEED value Rc_L XOR Rs_H and a low SEED value Rc_H XOR Rs_L; and encrypting the generated SEED values by a secret key. Also, according to another embodiment, the session key K' is generated by classifying the random number Rs obtained by decrypting the encrypted E(Rs) received from the financial system and the random number Rc generated by the IC card into high and low regions; XOR-operating a high region Rs_H and a low region Rs_L of the random number Rs and a high region Rc_H and a low region Rc_L of the random number Rc to generate a high SEED value Rs_L XOR Rc_H and a low SEED value Rs_H XOR Rc_L; and encrypting the generated SEED values by a secret key. Herein, it is preferable that the secret key is a master key stored separately on the IC card.

Also, according to an embodiment, the card verifier MAC' is generated by encrypting the random number Rs received from the financial system through the generated session key K'. Also, according to another embodiment, the card verifier MAC' is generated by encrypting the random number Rc generated by the IC card through the generated session key K'.

Also, the memory unit 210 of the IC chip includes a security structure based on the ISO/IEC 10202. Accordingly, the memory unit 210 includes: a protected area for storing secret information such as a Chip Serial Number (CSN); a COS control area; a user application area; a read/write access area; an application program area; and a File Allocation Table (FAT) management area, and the card storage information and user certificate information 215 for connection of an end-to-end security channel with the financial system on the communication network are stored in the area except the protected area and the COS control area. Also, according to the ISO/IEC 7816 and/or ISO/IEC 14443 standards, the memory unit 210 includes a file structure including: a Master File (MF) corresponding to a root file; an Answer To Reset (ART) including function information about at least one storage information in the MF subordinate; at least one Dedicate File (DF) corresponding to each ICC storage information; and an Element File (EF) disposed at the DF subordinate and including substantial information and/or data for a smart card service, and the user certificate information 215 or the server certificate information 230 for connection of an end-to-end security channel with the financial system on the communication network also includes such a file structure.

Also, it is preferable that the card storage information or the user certificate information 215 or the server certificate information 230 for connection of an end-to-end security channel with the financial system on the communication network includes: a dedicated file disposed at the master file subordinate and including characteristic information or unique ID information about the card storage information or the user certificate information 215 or the server certificate information 230; an element file disposed at the dedicated file subordinate and storing File Control Information (FCI); and at least one element file corresponding to the card information. Herein, the element file storing the FCI is an element file that stores a data byte corresponding to a response to a SELECT FILE command transmitted through a card terminal to the IC card by a program provided in the financial system. The element file includes: an FCP template transmitting a Basic Encoding Rules-Tag, Length, Value (BER-TLV) data object File Control Parameter (FCP) defined in TABLE 2 of the ISO/IEC 7816-4; and/or an FMD template transmitting a BER-TLV data object File Management Data (FMD) defined in TABLE 2 of the ISO/IEC 7816-4; and/or an FCI template transmitting the FCP and the FMD, and the template is searched according to the options of the SELECT FILE command. In general, if the FCP or the FMD is determined, the corresponding template is mandatory; and if the FCI option is determined, the use of the FCI template is optional.

Also, among the storage information provided in the IC card, the card storage information or the user certificate information 215 or the server certificate information 230 is selected based on a file identifier, a path, or an EF identifier. The file identifier based selection method uses a 2-byte identifier allocated to each file, which selects the card storage information or the user certificate information 215 or the server certificate information 230 on the basis of an identifier allocated to a dedicated file of the card storage information or the user certificate information 215 or the server certificate information 230. The path based selection method uses a "3FFF" identifier to select the card storage information or the user certificate information 215 or the server certificate information 230. The EF identifier based selection method selects the card storage information or the user certificate information 215 or the server certificate information 230 on the basis of a 5-bit (from '0' to '30') identifier allocated to each element file. In general, if the file identifier based selection method and the path based selection method are used, the card storage information or the user certificate information 215 or the server certificate information 230 may be accessed through the SELECT FILE command. If the file identifier based selection method is not used, a dedicated file of the card storage information or the user certificate information 215 or the server certificate information 230 may be omitted.

Also, the private key information (i.e., user private key information) stored in the storing unit provided in the server certificate information 230 or the user certificate information 215 for connection of an end-to-end security channel with the financial system on the communication network on the memory unit 210 of the IC chip provided in the IC card includes at least one information for receiving and decrypting the E(Rs) transmitted by encrypting the random number Rs generated by the financial system on the communication network. It is preferable that a file structure for the private key information accords with the financial IC card standard. Also, it is preferable that the private key information (i.e., user private key information) includes information for receiving and decrypting the E(Rs) transmitted by encrypting the random number Rs generated by the financial system on the communication network.

Also, the public key information (i.e., server public key information) stored in the storing unit provided in the server certificate information 230 or the user certificate information 215 for connection of an end-to-end security channel with the financial system on the communication network on the memory unit 210 of the IC chip provided in the IC card includes at least one information for generating the E(Rs) by encrypting the random number Rc to be transmitted to the financial system. It is preferable that a file structure for the public key information accords with the financial IC card standard. Also, it is preferable that the public key information (i.e., server public key information) includes information for generating the random number Rc to be transmitted to the financial system and encrypting the random key Rc by the public key information to generate the E(Rc).

Figure 3:
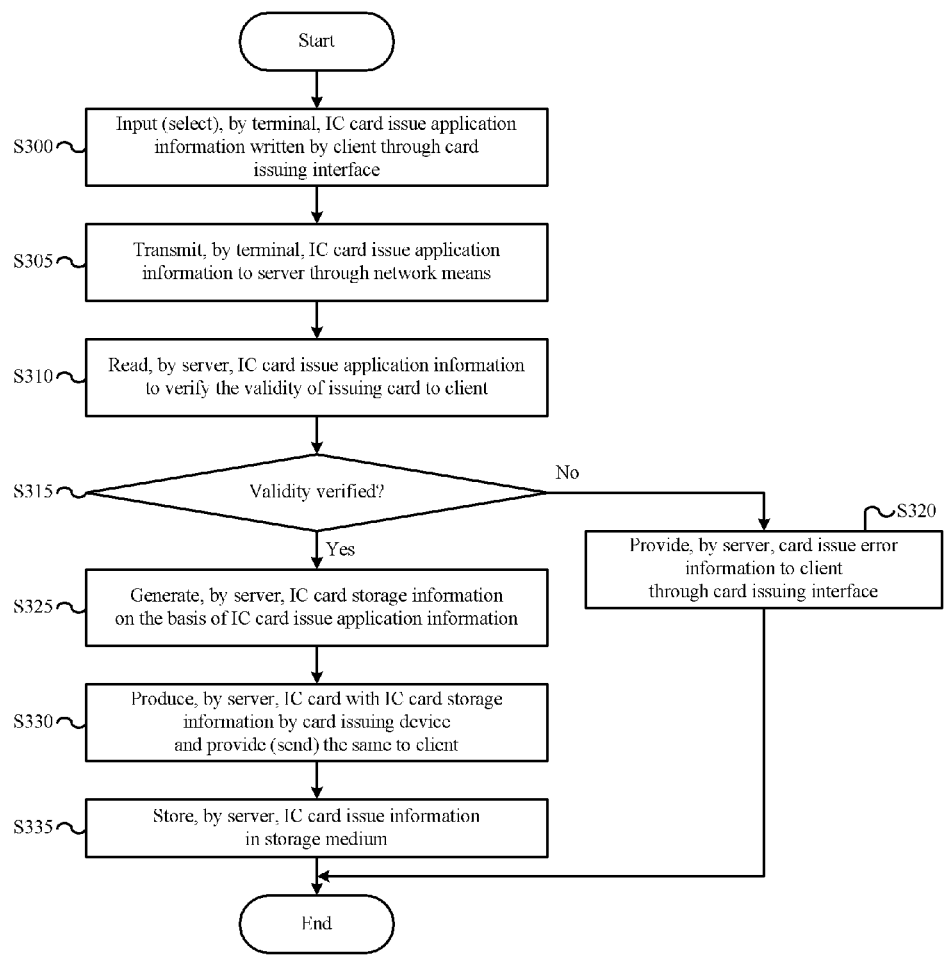
FIG. 3 is a flow diagram illustrating a card issuing process for connection of an end-to-end channel with a financial system according to an embodiment of the present invention.

FIG. 3 is a flow diagram illustrating a card issuing process for connection of an end-to-end channel with a financial system according to an embodiment of the present invention. That is, FIG. 3 illustrates a card issuing process in which, when a client writes a card issue application form through a face-to-face card issuing interface (e.g., the card issue application form, a staff terminal, and a network means) in the card issuing system of FIG. 1 to present the same to a card issuing staff, the card issuing staff input (selects) IC card issue application information corresponding to the card issue application form though a card issue terminal to transmit the same to the card issuing server, and the card issuing server issues an IC card for connection of an end-to-end security channel with the financial system to the client on the basis of the IC card issue application information. The present invention is not limited thereto and includes various modifications and additions that can be made by those of ordinary skill in the art. For example, although FIG. 3 illustrates that IC card issue information is stored in the storage medium after the IC card is produced and provided (or sent) to the client, the IC card issue information may be stored in the storage medium before or after the IC card is produced and provided (sent) to the client, depending on the intentions of those skilled in the art. Hereinafter, for the sake of convenience, the card issue terminal of FIG. 1 will be referred to as a terminal and the card issuing server will be referred to a server.

Referring to FIG. 3, for issue of the IC card for connection of an end-to-end security channel with the financial system, when the client writes a card issue application form (a document with a form for writing in at least one information field for connection of an end-to-end security channel with the financial system) through a face-to-face card issuing interface (e.g., the card issue application form, the staff terminal, and the network means) to present the same to a card issuing staff, the terminal inputs (selects) IC card issue application information corresponding to the written card issue application form through a user interface by the card issuing staff (S300), and transmits the IC card issue application information to the server through the network means (S305). Herein, the IC card issue application information includes at least one of client information of the card issue client and IC card information for certifying the IC card issued to the client is an IC card for connection of an end-to-end security channel with the financial system. As described above, it is preferable that the client information includes at least one of personal information of the card issue client (e.g., client name, resident registration number, address, wireless terminal information (or mobile phone number), and e-mail address) and member information of the client registered in the card issuing server (e.g., member ID information). Also, as described above, it is preferable that the IC card information includes at least one of authorized certificate information, server certificate information, and user certificate information provided in an IC card for connection of an end-to-end security channel with the financial system, and the IC card information may further include use specification information of the IC card.

Thereafter, the server receives the IC card issue application information from the terminal through the network means and reads the same to verify the card issue validity of issuing the IC card for connection of an end-to-end security channel with the financial system to the client on the basis of the client information included in the IC card issue application information (S310). It is preferable that the validity verification includes checking the real name of the client in connection with a real name checking server (not illustrated) through a communication means on the basis of the client name and the resident registration number included in the client information. Herein, if the IC card includes a credit card, it is preferable that the validity verification includes checking the credit information of the client in connection with a credit assessment server through a communication means on the basis of the client information. Also, if the IC card includes a check card/debit card, the validity verification includes checking the opening and normality of a client account associated with the check card/debit card in connection with a financial company server, in which the client account is opened, through a communication means on the basis of the client information.

If the validity of issuing the IC card to the client is not verified through the IC card issue application information (S315), the server provides card issue error information to the client through the card issuing interface (S320) and stops issuing the IC card to the client. On the other hand, if the validity of issuing the IC card to the client is verified through the IC card issue application information (S315), the server generates (or extracts) IC card storage information corresponding to the IC card to be issued to the client on the basis of the IC card issue application information (S325). Herein, as described above, the IC card storage information includes at least one of a card number corresponding to the IC card (e.g., a 16-digit card number), effective term information (partially omittable), and card issuing institution information (or code). For example, it is preferable that the card number includes a 4-digit card issuing institution number, a 2-digit card type number, a 9-digit serial number, and a check digit. Also, it is preferable that the effective term information includes the available term (or expiry date) of the IC card. The effective term information may be omitted if there is no effective term in the IC card. Also, it is preferable that the card issuing institution information (or code) includes at least one unique number (or unique code) assigned to a card issuing institution (or financial company) issuing the IC card to the client. Also, it is preferable that the generated IC card storage information includes a file structure operatable through a Chip Operating System (COS) provided in the IC chip.

Thereafter, the server produces an IC card having the IC card storage information through a card issuing device and provides (or sends) the generated IC card to the client (S330). Herein, as described above, it is preferable that the IC card issuing device includes a device that records the IC card storage information in a memory of an IC chip of the IC card.

Thereafter, the server stores IC card issue information, which includes at least one of client information included in the IC card issue application information provided from the client through the card issuing interface, the generated IC card storage information, and at least one certificate information for connection of an end-to-end security channel with the financial system (e.g., user certificate information 215 or server certificate information 230), in storage medium (S335). Herein, the IC card information and the client information included in the IC card issue information are the same as those described above. Also, as described above, it is preferable that the storage medium is provided in a DBMS on a financial system provided on the financial system (or connected with the financial system). The storage medium may be a ledger D/B provided in a DBMS on the financial system and/or a database connected with the ledger D/B.

Figure 4:
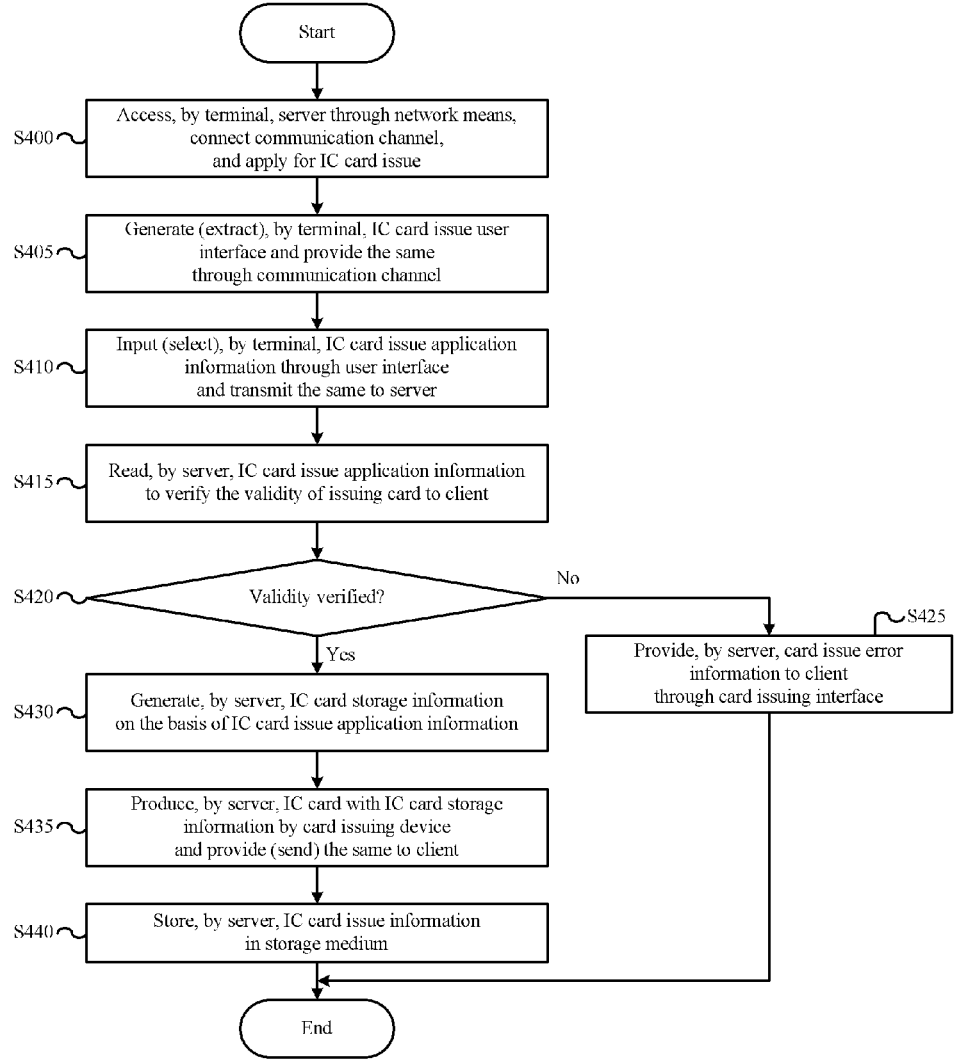
FIG. 4 is a flow diagram illustrating a card issuing process for connection of an end-to-end channel with a financial system according to another embodiment of the present invention.

FIG. 4 is a flow diagram illustrating a card issuing process for connection of an end-to-end channel with a financial system according to another embodiment of the present invention. That is, FIG. 4 illustrates a card issuing process in which, when a client connects to the card issuing server through a non-face-to-face card issuing interface (e.g., a network means and a client terminal including at least one of a wired terminal and a wireless terminal) in the card issuing system of FIG. 1 to input (select) and transmit IC card issue application information, the card issuing staff input (selects) IC card issue application information corresponding to the card issue application form though a card issue terminal to transmit the same to the card issuing server, and the card issuing server issues an IC card for connection of an end-to-end security channel with the financial system to the client on the basis of the IC card issue application information. The present invention is not limited thereto and includes various modifications and additions that can be made by those of ordinary skill in the art. For example, although FIG. 4 illustrates that IC card issue information is stored in the storage medium after the IC card is produced and provided (or sent) to the client, the IC card issue information may be stored in the storage medium before or after the IC card is produced and provided (sent) to the client, depending on the intentions of those skilled in the art. Hereinafter, for the sake of convenience, the card issue terminal of FIG. 1 will be referred to as a terminal and the card issuing server will be referred to a server.

Referring to FIG. 4, the client accesses the server through the terminal, connects a communication channel for card issue application, and applies for the issue of the IC card for connection of an end-to-end security channel with the financial system through the communication channel (S400). Then, the server generates (or selects) a user interface for the IC card issue and provides the same to the terminal through the communication channel (S405).

Thereafter, the terminal inputs (or selects) the IC card issue application information through the user interface and transmits the input (or selected) IC card issue application information to the server through the communication channel (S410). Herein, the IC card issue application information includes at least one of client information of the card issue client and IC card information for certifying the IC card issued to the client is an IC card for connection of an end-to-end security channel with the financial system. The client information and the IC card information are the same as those described with reference to FIG. 3.

Thereafter, the server receives the IC card issue application information from the terminal through the network means and reads the same to verify the card issue validity of issuing the IC card for connection of an end-to-end security channel with the financial system to the client on the basis of the client information included in the IC card issue application information (S415). Herein, the validity verification is the same as that described with reference to FIG. 3.

If the validity of issuing the IC card to the client is not verified through the IC card issue application information (S420), the server provides card issue error information to the client through the card issuing interface (S425) and stops issuing the IC card to the client. On the other hand, if the validity of issuing the IC card to the client is verified through the IC card issue application information (S420), the server generates (or extracts) IC card storage information corresponding to the IC card to be issued to the client on the basis of the IC card issue application information (S430). Herein, the IC card storage information is the same as that described with reference to FIG. 3.

Thereafter, the server produces an IC card having the IC card storage information through a card issuing device and provides (or sends) the generated IC card to the client (S435). Herein, it is preferable that the IC card issuing device includes a device that records the IC card storage information in a memory of an IC chip of the IC card.

Thereafter, the server stores IC card issue information, which includes at least one of client information included in the IC card issue application information provided from the client through the card issuing interface, the generated IC card storage information, and at least one certificate information for connection of an end-to-end security channel with the financial system (e.g., user certificate information 215 or server certificate information 230), in storage medium (S440). Herein, the IC card information and the client information included in the IC card issue information are the same as those described above. Also, the storage medium is the same as that described with reference to FIG. 3.

Figure 5:
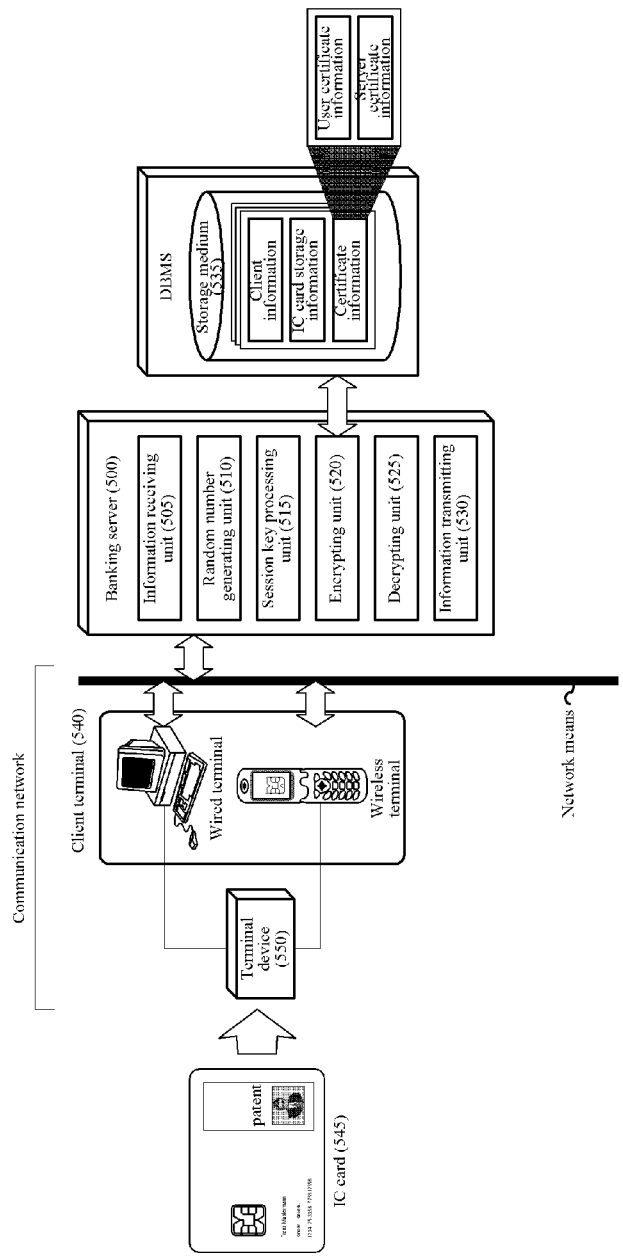
FIG. 5 is a schematic block diagram of a banking system for operation of an end-to-end security channel between an IC card and a server on a communication network according to an embodiment of the present invention.

FIG. 5 is a schematic block diagram of a banking system for operation of an end-to-end security channel between an IC card 545 and a server on a communication network according to an embodiment of the present invention. That is, FIG. 5 illustrates a schematic structure of the banking system in which a client desiring to use a financial transaction service accesses a server on the banking system through the IC card 545 to connect a communication channel and then generates a security channel for connection of an end-to-end security channel between the IC card 545 and the server on the communication network. The present invention is not limited thereto and includes various modifications and additions that can be made by those of ordinary skill in the art.

Referring to FIG. 5, the banking system for operation of an end-to-end security channel between the IC card 545 and the server on the communication network includes at least one client terminal 540 including at least one wired terminal and/or wireless terminal used by a client, and the client terminal 540 has a communication channel with a banking server 500 of the banking system through a network means. When the client request a connection to the banking server 500 through at least one client terminal including a wired terminal connected to a wired communication network and/or a wireless terminal connected to a wireless communication network, the banking server 500 requests a PIN input through a terminal device 550 connected with the client terminal 540. Upon completion of PIN certification in an IC card 545, the banking server 500 transmits/receives at least one information for operation of an end-to-end security channel between the IC card 545 and the server on the communication network to connect a security channel.

Also, the terminal device 550 connected with the client terminal 540 is a general term for all terminal devices 550 having a function for reading the IC card 545, and it is preferable that the client terminal 540 includes any terminal having a function for reading the IC card 545. Also, the wired terminal connected to the wired communication network and the wireless terminal connected to the wireless communication network are the same as those described with reference to FIG. 1.

Also, it is preferable that the banking server 500 connected with the client terminal includes at least one of an Internet banking server, a wireless banking server, a telebanking server, and a TV banking server according to the characteristics of the client terminal and the network means, or includes a separate web server for the information registration. Also, it is preferable that the network means connecting the client terminal to the banking server 500 includes at least one of a CDMA based mobile communication network, an IEEE 802.16x based portable internet, and a DataTAX/Mobitex based wireless data communication network according to the type of the wireless communication network to which the client terminal is connected, or includes any type of wireless communication network, which will be proposed in the future, including a wireless interval. Also, it is preferable that the client terminal has a functional configuration (e.g., a browser program and a communication function, or a communication program and a communication function communicating with the banking server 500) for outputting at least one user interface provided from the banking server 500, inputting and/or selecting at least one information through the user interface, and transmitting the information to the banking server 500.

Also, the storage medium stores IC card (545) issue information including client information about the IC card 545 issued through the card issuing server, IC card (545) storage information, and at least one certificate information. It is preferable that the client information included in the IC card (545) issue information includes at least one of personal information of the card issue client (e.g., client name, resident registration number, address, wireless terminal information (or mobile phone number), and e-mail address) and member information of the client registered in the card issuing server (e.g., member ID information). Also, for connection of an end-to-end security channel between the IC card 545 and the financial system, it is preferable that the certificate information included in the IC card (545) issue information includes at least one of user certificate information and server certification information. Herein, it is preferable that the user certificate information includes public key information for encrypting a random number Rs generated by the financial system for connection of an end-to-end security channel with the financial system. Also, it is preferable that the server certificate information includes private key information for decrypting the generated random number Rs after generation of a random number Rc to be transmitted to the financial system for connection of an end-to-end security channel with the financial system. Also, certificate management information may be further included to manage the certificate information including at least one of the user certificate information and the server certificate information. According to an embodiment, the storage medium 535 is provided in a DBMS on a financial system provided on the financial system (or connected with the banking system). Herein, the storage medium 535 may be a ledger D/B provided in the DBMS on the financial system, and/or a database connected with the ledger D/B. According to another embodiment, the storage medium 535 may be provided in a DBMS on at least one banking system including an Internet banking system, a wireless banking system, or a TV banking system provided on (or connected with) the banking system.

The banking server 500 is a general term for the components of the banking system connected to the IC card 45 through a communication network including the client terminal 540 and the terminal device 550. The banking server 500 may include at least one server (or device), or may be embodied in at least one program recorded in a recording medium provided in the server (or device). Also, the banking server 500 includes: a random number generating unit 510 for generating a random number Rs to be transmitted to the IC card 545 for operation of an end-to-end security channel between the IC card 545 and the server on the communication network when a communication channel is connected with the IC card 545; an encrypting unit 520 for encrypting the generated random number Rs through a public key corresponding to the user certificate information provided in the IC card 545, to generate an encrypted random number E(Rs); and an information transmitting unit 530 for transmitting the generated E(Rs) to the IC card 545 through the communication network.

When a communication channel is connected with the IC card 545, the random number generating unit 510 generates a random number Rs to be transmitted to the IC card 545 for operation of an end-to-end security channel between the IC card 545 and the server on the communication network, and provides the generated random number Rs to the encrypting unit 520.

Also, the encrypting unit 520 encrypts the generated random number Rs through a public key corresponding to the user certificate information provided in the IC card 545 to generate an encrypted random number E(Rs), and provides the generated E(Rs) to the information transmitting unit 530.

Also, the information transmitting unit 530 transmits the generated E(Rs) to the IC card 545 through the communication network. According to an embodiment, the generated E(Rs) is transmitted through the client terminal 540 and the terminal device 550 having an IC card (545) reader function and connected with the client terminal 540. Also, according to another embodiment, the generated E(Rs) is transmitted directly to the IC card 545 through the terminal device 550 having an IC card (545) reader function.

Also, the banking server 500 further includes: an information receiving unit 505 for receiving the E(Rc) and a card verifier MAC' generated by the IC card 545; a decrypting unit 525 for decrypting the received E(Rc) by a server private key to extract the random number Rc generated by the IC card 545; a session key processing unit 515 for generating a session key K by using the random number Rc generated by the IC card 545 and the random number Rs generated by the banking server 500; an encrypting unit 520 for encrypting the generated random number Rs by the generated session key K to generate a server verifier MAC; and an information transmitting unit 530 for transmitting the generated server verifier MAC to the IC card 545 through the communication network. Also, the banking server 500 further includes a session key processing unit 515 for comparing the server verifier MAC generated by the encrypting unit 520 with the card verifier MAC' received from the IC card 545 to verify the session key generated by the server.

The information receiving unit 505 receives the E(Rc) and a card verifier MAC' generated by the IC card 545, provides the received E(Rc) to the decrypting unit 525, and provides the received card verifier MAC' to the session key processing unit 515. According to an embodiment, the E(Rc) and the card verifier MAC' are received from the IC card 545 through the client terminal 540 and the terminal device 550 having an IC card (545) reader function and connected with the client terminal 540. According to another embodiment, the E(Rc) and the card verifier MAC' are received directly from the IC card 545 through the terminal device 550 having an IC card (545) reader function.

Also, the decrypting unit 525 decrypts the received E(Rc) by a server private key to extract the random number Rc generated by the IC card 545, and provides the extracted random number Rc to the session key processing unit 515.

Also, the session key processing unit 515 generates a session key K by using the random number Rc generated by the IC card 545 and the random number Rs generated by the banking server 500. Also, the session key processing unit 515 has a function for comparing the server verifier MAC generated by the encrypting unit 520 with the card verifier MAC' received from the IC card 545 to verify the session key generated by the server. In an embodiment, the session key K is generated by classifying the random number Rs generated by the banking server 500 and the random number Rc generated by the IC card 545 into high and low regions; Exclusive OR (XOR)-operating a high region Rs_H and a low region Rs_L of the random number Rs and a high region Rc_H and a low region Rc_L of the random number Rc to generate a high SEED value Rc_L XOR Rs_H and a low SEED value Rc_H XOR Rs_L; and encrypting the generated SEED values by a secret key. In another embodiment, the session key K is generated by classifying the random number Rs generated by the banking server 500 and the random number Rc generated by the IC card 545 into high and low regions; XOR-operating a high region Rs_H and a low region Rs_L of the random number Rs and a high region Rc_H and a low region Rc_L of the random number Rc to generate a high SEED value Rs_L XOR Rc_H and a low SEED value Rs_H XOR Rc_L; and encrypting the generated SEED values by a secret key.

Also, the encrypting unit 520 encrypts the generated random number Rs of the banking server 500 by the generated session key K to generate a server verifier MAC, and provides the generated server verifier MAC to the information transmitting unit 530.

Also, the information transmitting unit 530 transmits the generated server verifier MAC to the IC card 545 through the communication network. According to an embodiment, the generated server verifier MAC is transmitted through the client terminal 540 and the terminal device 550 having an IC card (545) reader function and connected with the client terminal 540. Also, according to another embodiment, the generated server verifier MAC is transmitted directly to the IC card 545 through the terminal device 550 having an IC card (545) reader function.

Also, the banking server 500 includes: an information receiving unit 505 for receiving encrypted data E(Data') from the IC card 545; a decrypting unit 525 for decrypting the received encrypted data E(Data') by the generated session key K; an encrypting unit 520 for encrypting, if there is Data to be transmitted to the IC card 545 through the communication network, the Data by the session key K to generate encrypted data E(Data); and an information transmitting unit 530 for transmitting the generated E(Data) to the IC card 545 through the communication network.

The information receiving unit 505 receives encrypted data E(Data') from the IC card 545, and provides the received encrypted data E(Data') to the decrypting unit 525. According to an embodiment, the encrypted data E(Data') are received from the IC card 545 through the client terminal 540 and the terminal device 550 having an IC card (545) reader function and connected with the client terminal 540. According to another embodiment, the encrypted data E(Data') are received directly from the IC card 545 through the terminal device 550 having an IC card (545) reader function.

Also, the decrypting unit 525 decrypts the received encrypted data E(Data') by the generated session key K, and it is preferable that the decrypted data Data' provide a financial transaction service corresponding to the data. Herein, a method of decrypting the encrypted data E(Data') by a session key K' in the IC card 545 includes all the well-known methods.

Also, if there is Data to be transmitted to the IC card 545 through the communication network, the encrypting unit 520 encrypts the Data by the session key K to generate encrypted data E(Data), and provides the generated encrypted data E(Data) to the information transmitting unit 530. Herein, a method of encrypting the Data by the session key K includes all the well-known methods.

Also, the information transmitting unit 530 transmits the generated E(Data) to the IC card 545 through the communication network. According to an embodiment, the generated E(Data) are transmitted to the IC card 545 through the client terminal 540 and the terminal device 550 having an IC card (545) reader function and connected with the client terminal 540. Also, according to another embodiment, the generated E(Data) are transmitted to the IC card 545 through the terminal device 550 having an IC card (545) reader function.

Figure 6:
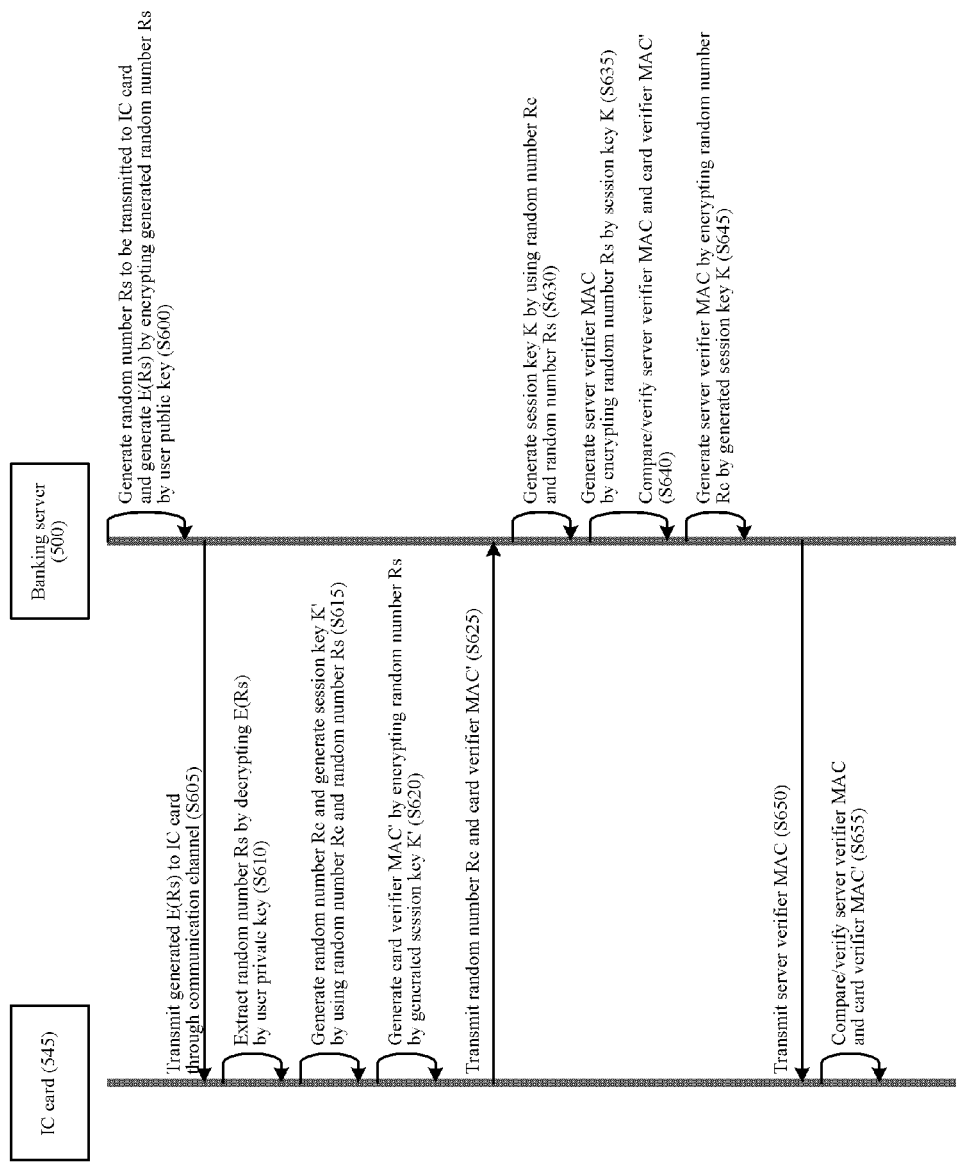
FIG. 6 is a flow diagram illustrating an operation of a banking system for operation of an end-to-end security channel between an IC card and a server on a communication network according to an embodiment of the present invention.

FIG. 6 is a flow diagram illustrating an operation of a banking system for operation of an end-to-end security channel between an IC card 545 and a server on a communication network according to an embodiment of the present invention. That is, FIG. 6 illustrates an operation of the banking system in which a client desiring to use a financial transaction service accesses a server on the banking system through the IC card 545 to connect a communication channel and then generates a security channel for connection of an end-to-end security channel between the IC card 545 and the server on the communication network. The present invention is not limited thereto and includes various modifications and additions that can be made by those of ordinary skill in the art. Hereinafter, for the sake of convenience, the IC card 545 of FIG. 5 will be referred to as a card and the banking server 500 of FIG. 5 will be referred to a server.

Referring to FIG. 6, when a communication channel is connected with the IC card 545, the server 500 generates a random number Rs to be transmitted to the IC card 545 for operation of an end-to-end security channel between the IC card 545 and the server on the communication network, generates an E(Rs) by encrypting the generated random number Rs by a public key corresponding to user certificate information provided in the IC card 545 (S600), and transmits the generated E(Rs) to the card (S605).

Thereafter, the terminal extracts a random number Rs by decrypting the received E(Rs) by a user private key (S610), and generates a session key K' by using the random number Rs and a random number Rc (S615). According to an embodiment, the session key K' is generated by classifying the random number Rs obtained by decrypting the encrypted E(Rs) received from the financial system and the random number Rc generated by the IC card 545 into high and low regions; Exclusive OR (XOR)-operating a high region Rs_H and a low region Rs_L of the random number Rs and a high region Rc_H and a low region Rc_H and a low region Rc_L of the random number Rc to generate a high SEED value Rc_L XOR Rs_H and a low SEED value Rc_H XOR Rs_L; and encrypting the generated SEED values by a secret key. Also, according to another embodiment, the session key K' is generated by classifying the random number Rs obtained by decrypting the encrypted E(Rs) received from the financial system and the random number Rc generated by the IC card 545 into high and low regions; XOR-operating a high region Rs_H and a low region Rs_L of the random number Rs and a high region Rc_H and a low region Rc_L of the random number Rc to generate a high SEED value Rs_L XOR Rc_H and a low SEED value Rs_H XOR Rc_L; and encrypting the generated SEED values by a secret key.

Thereafter, the card generates a card verifier MAC' by encrypting the random number Rs by the generated session key K' (S620), and transmits the generated card verifier MAC' and the random number Rc to the server (S625). Herein, it is preferable that the card verifier MAC' is generated by encrypting the random number Rs received from the financial system by the generated session key K'.

Thereafter, the server generates a session key K by using the random number Rc and the random number Rs (S630). According to an embodiment, the session key K is generated by classifying the random number Rs generated by the banking server 500 and the random number Rc generated by the IC card 545 into high and low regions; Exclusive OR (XOR)-operating a high region Rs_H and a low region Rs_L of the random number Rs and a high region Rc_H and a low region Rc_L of the random number Rc to generate a high SEED value Rc_L XOR Rs_H and a low SEED value Rc_H XOR Rs_L; and encrypting the generated SEED values by a secret key. Also, according to another embodiment, the session key K is generated by classifying the random number Rs generated by the banking server 500 and the random number Rc generated by the IC card 545 into high and low regions; XOR-operating a high region Rs_H and a low region Rs_L of the random number Rs and a high region Rc_H and a low region Rc_L of the random number Rc to generate a high SEED value Rs_L XOR Rc_H and a low SEED value Rs_H XOR Rc_L; and encrypting the generated SEED values by a secret key.

Thereafter, the server generates a server verifier MAC by encrypting the random number Rs by the generated session key K (S635), compares/verifies the generated server verifier MAC and the received card verifier MAC' (S640), generates a server verifier MAC by encrypting the random number Rc by the generated session key K (S645), and transmits the generated server verifier MAC to the card (S650). Herein, if the card verifier is different from the server verifier, the security channel may be disconnected or a financial transaction channel may be reset.

Thereafter, the card compares/verifies the server verifier MAC and the card verifier MAC' (S655).

Figure 7:
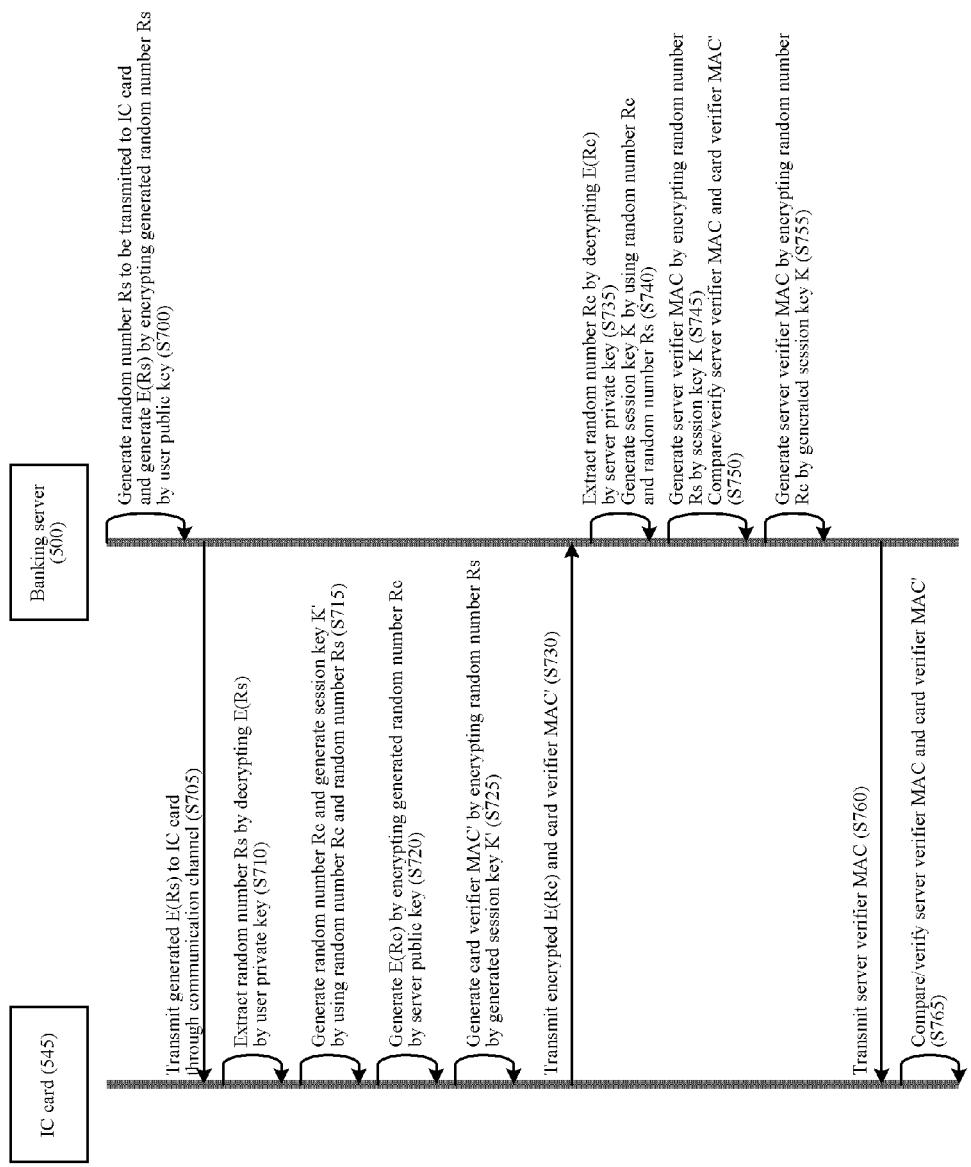
FIG. 7 is a flow diagram illustrating an operation of a banking system for operation of an end-to-end security channel between an IC card and a server on a communication network according to another embodiment of the present invention.

FIG. 7 is a flow diagram illustrating an operation of a banking system for operation of an end-to-end security channel between an IC card 545 and a server on a communication network according to another embodiment of the present invention. The banking system operation of FIG. 7 is identical to the banking system operation of FIG. 6 with the exception that the banking system operation of FIG. 7 further includes a verification process using a server public key and a server private key. That is, the banking system operation of FIG. 7 further includes a process in which when the IC card encrypts a generated random number Rc by the server public key and transmits the same to the server, the server decrypts the same by the server private key, thereby securing the verification. The present invention is not limited thereto and includes various modifications and additions that can be made by those of ordinary skill in the art. Hereinafter, for the sake of convenience, the IC card 545 of FIG. 5 will be referred to as a card and the banking server 500 of FIG. 5 will be referred to a server.

Referring to FIG. 7, when a communication channel is connected with the IC card 545, the server 500 generates a random number Rs to be transmitted to the IC card 545 for operation of an end-to-end security channel between the IC card 545 and the server on the communication network, generates an E(Rs) by encrypting the generated random number Rs by a public key corresponding to user certificate information provided in the IC card 545 (S700), and transmits the generated E(Rs) to the card (S705).

Thereafter, the terminal extracts a random number Rs by decrypting the received E(Rs) by a user private key (S710), and generates a session key K' by using the random number Rs and a random number Rc (S715). Herein, a method of generating the session key K' is the same as that described with reference to FIG. 6.

Thereafter, the card generates an E(Rc) by encrypting the generated random number Rc by a server public key (S720), generates a card verifier MAC' by encrypting the random number Rs by the generated session key K' (S725), and transmits the generated card verifier MAC' and the encrypted E(Rc) to the server (S730). Herein, it is preferable that the card verifier MAC' is generated by encrypting the random number Rs received from the financial system by the generated session key K', as described with reference to FIG. 6.

Thereafter, the server extracts a random number Rc by decrypting the received E(Rc) by a server private key (S735), generates a session key K by using the random number Rc and the random number Rs (S740). Herein, a method of generating the session key K is the same as that described with reference to FIG. 6.

Thereafter, the server generates a server verifier MAC by encrypting the random number Rs by the generated session key K (S745), compares/verifies the generated server verifier MAC and the received card verifier MAC' (S750), generates a server verifier MAC by encrypting the random number Rc by the generated session key K (S755), and transmits the generated server verifier MAC to the card (S760). Herein, if the card verifier is different from the server verifier, the security channel may be disconnected or a financial transaction channel may be reset.

Thereafter, the card compares/verifies the server verifier MAC and the card verifier MAC' (S765).

As described above, the present invention can provide a powerful security function by eliminating a hacking danger possibility in advance. Although the present invention has been described with reference to the specific embodiments, it is not limited thereto. Therefore, it will be readily understood by those skilled in the art that various modifications and changes can be made thereto without departing from the spirit and scope of the present invention defined by the appended claims.

The invention claimed is:

1. A method for connecting an end-to-end security channel between an IC card and a server on a communication network, comprising the steps of:
generating, by the server, a random number Rs for transmission to the IC card, generating an E(Rs) by encrypting the random number Rs by a user public key, and transmitting the E(Rs) to the IC card through the communication network;
receiving, by the IC card, the E(Rs) through the communication network and extracting the random number Rs by decrypting the E(Rs) by a user private key;
generating, by the IC card, a random number Rc to be transmitted to the server, generating a session key K' by the random number Rs and the random number Rc, and generating a first card verifier MAC' by encrypting the random number Rs by the session key K';
transmitting, by the IC card, the random number Rc and the first card verifier MAC' to the server through the communication network;
receiving, by the server, the random number Rc and the first card verifier MAC' through the communication network, generating a session key K by the random number Rs and the random number Rc, and generating a first server verifier MAC by encrypting the random number Rs by the session key K;
comparing, by the server, the first card verifier MAC' and the first server verifier MAC to certify the session key K;
encrypting, by the server, the random number Rc by the session key K to generate a second server verifier MAC;
transmitting, by the server, the second server verifier MAC to the IC card through the communication network;
receiving, by the IC card, the second server verifier MAC and encrypting the random number Rc by the session key K' to generate a second card verifier MAC';
comparing, by the IC card, the second card verifier MAC' and the second server verifier MAC to certify the session key K'; and
processing that an end-to-end security channel is connected between the IC card and the server, if the session key K' is certified.

2. A method for connecting an end-to-end security channel between an IC card and a server on a communication network, comprising the steps of:
generating, by the server, a random number Rs for transmission to the IC card, generating an E(Rs) by encrypting the random number Rs by a user public key, and transmitting the E(Rs) to the IC card through the communication network;
receiving, by the IC card, the E(Rs) through the communication network and extracting the random number Rs by decrypting the E(Rs) by a user private key;
generating, by the IC card, a random number Rc to be transmitted to the server, generating an E(Rc) by encrypting the random number Rc by a server public key, generating a session key K' by the random number Rs and the random number Rc, and generating a first card verifier MAC' by encrypting the random number Rs by the session key K';
transmitting, by the IC card, the E(Rc) and the first card verifier MAC' to the server through the communication network;
receiving, by the server, the E(Rc) and the first card verifier MAC' through the communication network, extracting the random number Rc by decrypting the received E(Rc) by a server private key, generating a session key K by the random number Rs and the random number Rc, and generating a first server verifier MAC by encrypting the random number Rs by the session key K;
comparing, by the server, the first card verifier MAC' and the first server verifier MAC to certify the session key K;
encrypting, by the server, the random number Rc by the session key K to generate a second server verifier MAC;
transmitting, by the server, the second server verifier MAC to the IC card through the communication network;
receiving, by the IC card, the second server verifier MAC and encrypting the random number Rc by the session key K' to generate a second card verifier MAC';
comparing, by the IC card, the second card verifier MAC' and the second server verifier MAC to certify the session key K'; and
processing that an end-to-end security channel is connected between the IC card and the server, if the session key K' is certified.

3. The method of claim 1 or 2, further comprising the steps of:
   generating, by the IC card, Data' to be transmitted to the server through the communication network;
   encrypting, by the IC card, the generated Data' by the session key K' to generate E(Data'); and
   transmitting, by the IC card, the generated E(Data') to the server through the communication network.

4. The method of claim 3, further comprising the step of receiving, by the IC card, information input by a terminal with an IC card reader.

5. The method of claim 3, further comprising the steps of:
   receiving, by the server, the E(Data') from the IC card through the communication network; and
   decrypting, by the server, the received E(Data') by the session key K to extract the Data'.

6. The method of claim 1 or 2, further comprising the steps of:
   if there is Data to be transmitted to the IC card, encrypting, by the server, the Data by the session key K to generate E(Data); and
   transmitting, by the server, the generated E(Data) to the IC card through the communication network.

7. The method of claim 6, further comprising the steps of:
   receiving, by the IC card, the E(Data) through the communication network; and
   decrypting, by the IC card, the received E(Data) by the session key K' to extract the Data.

8. The method of claim 7, further comprising the step of providing, by the IC card, the extracted Data to a terminal with an IC card reader.

9. A system for connecting an end-to-end security channel between an IC card and a server on a communication network, comprising:
   a server for generating a random number Rs for transmission to the IC card, generating an E(Rs) by encrypting the random number Rs by a user public key, and transmitting the E(Rs) to the IC card through the communication network; and
   an IC card for receiving the E(Rs) through the communication network, extracting the random number Rs by decrypting the E(Rs) by a user private key, generating a random number Rc to be transmitted to the server, generating a session key K'=Rs∥Rc by the random number Rs and the random number Rc, generating a first card verifier MAC' by encrypting the random number Rs by the generated session key K', and transmitting the random number Rc and the first card verifier MAC' to the server through the communication network,
   wherein the server receives the random number Rc and the first card verifier MAC' through the communication network, generates a session key K=Rs∥Rc by the random number Rc and the random number Rs, generates a first server verifier MAC by encrypting the random number Rs by the session key K, compares the first card verifier MAC' and the first server verifier MAC to certify the session key K, generates a second server verifier MAC by encrypting the random number Rc by the session key K if the session key K is certified, and transmits the generated second server verifier MAC to the IC card through the communication network, and
   wherein the IC card receives the second server verifier MAC, generates a second card verifier MAC' by encrypting the random number Rc by the session key k', compares the second card verifier MAC' and the second server verifier MAC to certify the session key K', and if the session key K' is certified, processes that an end-to-end security channel is connected between the IC card and the server.

10. A system for connecting an end-to-end security channel between an IC card and a server on a communication network, comprising:
   a server for generating a random number Rs for transmission to the IC card, generating an E(Rs) by encrypting the random number Rs by a user public key, and transmitting the E(Rs) to the IC card through the communication network; and
   an IC card for receiving the E(Rs) through the communication network, extracting the random number Rs by decrypting the E(Rs) by a user private key, generating a random number Rc to be transmitted to the server, generating an E(Rc) by encrypting the random number Rc by a server public key, generating a session key K'=Rs∥Rc by the random number Rs and the random number Rc, generating a first card verifier MAC' by encrypting the random number Rs by the generated session key K', and transmitting the E(Rc) and the first card verifier MAC' to the server through the communication network,
   wherein the server receives the E(Rc) and the first card verifier MAC' through the communication network, extracts the random number Rc by decrypting the E(Rc) by a user public key, generates a session key K=Rs∥Rc by the random number Rs and the random number Rc, generates a first server verifier MAC by encrypting the random number Rs by the session key K, compares the first card verifier MAC' and the first server verifier MAC to certify the session key K, generates a second server verifier MAC by encrypting the random number Rc by the session key K if the session key K is certified, and transmits the generated second server verifier MAC to the IC card through the communication network, and
   wherein the IC card receives the second server verifier MAC, generates a second card verifier MAC' by encrypting the random number Rc by the session key k', compares the second card verifier MAC' and the second server verifier MAC to certify the session key K', and if the session key K' is certified, processes that an end-to-end security channel is connected between the IC card and the server.

11. The system of claim 9 or 10, further comprising a terminal having an IC card reader capable of reading the IC card and providing a communication node between the IC card and the server.

12. The system of claim 9 or 10, wherein the IC card comprises an IC chip having a memory for storing at least one of user certificate information with the user private key and server certificate information with the server public key.

* * * * *